United States Patent [19]

Hall et al.

[11] 4,185,254

[45] Jan. 22, 1980

[54] ANNULAR LASER HAVING ADJUSTABLE AND INTERCHANGEABLE LASER WINDOWS

[75] Inventors: Lawrence H. Hall, Northridge; John R. Novak, Rodondo Beach, both of Calif.

[73] Assignee: The United States of America as represented by the Secretary of the Air Force, Washington, D.C.

[21] Appl. No.: 841,879

[22] Filed: Oct. 13, 1977

[51] Int. Cl.² .......................... H01S 3/03; H01S 3/092
[52] U.S. Cl. .......................... 331/94.5 D; 331/94.5 G; 331/94.5 P
[58] Field of Search .............. 331/94.5 D, 94.5 G, 331/94.5 P, 94.5 C

[56] References Cited

U.S. PATENT DOCUMENTS

| | | | |
|---|---|---|---|
| 3,353,115 | 11/1967 | Maiman | 331/94.5 P |
| 3,404,352 | 10/1968 | Bowness | 331/94.5 G |
| 3,478,608 | 11/1969 | Met | 331/94.5 C X |
| 3,564,452 | 2/1971 | Rempel | 331/94.5 G |
| 3,588,737 | 6/1971 | Chow | 331/94.5 G |
| 3,752,554 | 8/1973 | Thatcher | 316/19 |
| 3,775,700 | 11/1973 | Garman et al. | 331/94.5 D |
| 3,864,029 | 2/1975 | Mohler | 331/94.5 C X |
| 3,875,530 | 4/1975 | Manoukian | 331/94.5 D |
| 3,883,820 | 5/1975 | Burns et al. | 331/94.5 D X |
| 3,940,711 | 2/1976 | Casperson | 331/94.5 C |

FOREIGN PATENT DOCUMENTS 1514069  9/1969  Fed. Rep. of Germany ...... 331/94.5 P
1639199  9/1970  Fed. Rep. of Germany ...... 331/94.5 C

OTHER PUBLICATIONS

A. Crocker et al., "Carbon-Dioxide Laser with High Power Per Unit Length", *Electronics Letters*, Feb. 20 1969, Vol. 5, No. 4, pp. 63-64.

Garnsworthy et al., "Atmospheric-Pressure Pulsed $CO_2$ Laser Utilizing Preionization by High-Energy Electrons", APL, Vol. 19, No. 12, DEC. 15 1971, pp. 506-508.

*Primary Examiner*—James W. Davie
*Attorney, Agent, or Firm*—Joseph E. Rusz; Jacob N. Erlich

[57] ABSTRACT

An annular laser having an elongated centrally located flashlamp enclosed in a quartz tube as well as adjustable and interchangeable laser windows. The position of the flashlamp produces a gain region with a smoothly varying radial intensity distribution with uniform azimuthal output. The mechanism which permits adjustment and interchangeability of the laser windows allows the invention to be utilized as a useful tool in the study of annular optics.

13 Claims, 2 Drawing Figures

ANNULAR LASER HAVING ADJUSTABLE AND INTERCHANGEABLE LASER WINDOWS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly, to an annular optically pumped laser which incorporates therein adjustable as well as interchangeable windows.

Lasers are now well established in the art for generating coherent electromagnetic radiation in the optical frequency range. The operation of a laser is based upon the fact that the atomic systems represented by the atoms of the laser material can exist in any of a series of discrete energy level or states, the systems absorbing energy in the optical frequency range in going to a higher state and emitting it when going to a lower state. In the case of ruby as a laser material, three energy levels are utilized. The atomic systems are raised from the lower or ground level to the higher of the three levels by irradiation from a strong light source which need not be coherent but should preferably have a high concentration of energy in the absorbing wavelengths. A radiationless transition then occurs from the highest state to an intermediate or metastable state. This is followed by a transition with photon emission from the intermediate state back to the ground state. It is the last transition that is of interest since this transition is the source of the coherent light or electromagnetic energy produced by the laser.

The operation of raising the energy level of the laser material to produce the desired photon emission is referred to in the art as "pumping" and when more atoms reach an excited metastable state than remain in a lower energy level, a "population inversion" is said exist.

The active material in the laser is made optically resonant by placing reflectors at either end thereof to form a resonant cavity. The reflector on at least one end is made partially transmissive so that there will be an escape from the resonant cavity of a laser beam.

Gas lasers are generally made up of an elongated hollow tube sealed at both ends thereof by a pair of laser windows and filled with any suitable laser reactant mixture. Adjacent the sealing windows are situated the reflective surfaces, forming therebetween the resonant cavity. The lasing action takes place upon the application of a suitable pumping pulse to the laser reactants. The pumping pulse may be in the form of a flash of intense light. For proper operation of the laser, it is extremely important that the positions of the laser windows and the reflectors which form the resonant cavity be precisely aligned.

In the prior art many alignment devices have been used for laser mirrors, unfortunately these devices where unacceptable for the purpose of aligning the laser windows since the seal between the laser windows and the end of the laser tube must hermetically seal the interior of the tube, and, must prevent the release of gaseous impurities into the tube.

In addition to the above criteria it would be extremely practical if the laser windows were not only adjustably mounted to the laser head, but also mounted in such a manner as to permit their rapid and easy removability for purposes of interchanging a plurality of laser windows. Such a design would allow the laser to be used as a basic tool in the study and/or evaluation of annular optics.

Heretofore, the effectiveness of adjustable laser windows left much to be desired. In addition to their cumbersome and complex construction many problems resulted in maintaining proper sealing of the windows once the window was adjusted or positioned on the laser head. It is therefore clearly evident that not only is there a need for a laser having easily adjustable windows, but there is also an added economic benefit which can be derived if the laser head is capable of reliably accepting a plurality of various laser windows.

SUMMARY OF THE INVENTION

The instant invention overcomes the problems set forth hereinabove by providing an annular laser which incorporates therein adjustable windows and reflectors as well as having a laser head capable of accepting a plurality of alternate windows.

The annular laser of this invention is made up of a laser head in the form of an elongated, cylindrically-shaped tubular body which contains therein a centrally located xenon flashlamp. The tubular laser body is preferably made of stainless steel while the flashlamp is contained within a quartz tube. Calcium fluoride windows are placed on either end of the tubular head to seal the laser with the reflectors being either formed as part of the windows or located on an independent adjustable mount adjacent thereto.

In operation, a mixture of $N_2F_4:H_2/D_2:He$, that is, Tetrafluoro Hydrazine ($N_2F_4$) and either Hydrogen ($H_2$) or Deuterium ($D_2$) and Helium (He) in a ratio of 30:5:100 are flowed through the laser head within the resonant cavity at a pressure of several torr. $H_2$ is used if HF lasing at 2.7 microns is desired, and $D_2$ is used if DF lasing at 3.8 microns is desired. The xenon flashlamp is then discharged. The UV and near-UV light from the flash dissociates the $N_2F_4$ yielding F-atoms, which initiate the chemical reaction and give vibrationally excited HF or DF.

The instant invention has a number of features that are highly desirable for the evaluation of annular optics. The central position of the flashlamp produces an HF or DF gain region with a smoothly-varying radial intensity distribution with uniform azimuthal output. This is a consequence of the low absorption of the flashlamp light by the $N_2F_4$ leading to uniform initiation levels throughout the discharge tube, contrasted with the lack of uniformity found in electrical pulse discharge lasers. A second feature is the quartz tube that contains the xenon flashlamp. The diameter of this tube is of increased size so that the gain region, which is contained between the quartz tube and the laser body, is entirely accessible through the laser windows on the ends. This feature increases the gain medium uniformity by preventing absorption of flashlamp energy in an inaccessible region of the laser head.

Another important feature of this invention is the capability of the laser to align the windows parallel to each other within 30 seconds of arc. This is essential for interferometric studies of laser optics utilizing the laser of this invention. A unique aspect of the instant invention involves the support of the flashlamp in such a way that window alignment is possible. The laser windows are generally calcium fluoride and are anti-reflection coated. Each window is attached to the quartz tube, which contains the flashlamp, by a seal. The reflectors may be formed as part of the window or independent thereof. The body of the seal is mounted in a circular hole cut through the laser window and is held in position with epoxy to give a rigid vacuum-tight seal. An O-ring is compressed by a screw fitting until a vacuum seal is formed between the body of the seal and the quartz tube. Each window is held against an O-ring in the end of the laser head body by a large diameter screw nut fitting. The dimensions of the inner and outer fittings are carefully chosen not to obstruct the laser window area. A plurality of micrometer-thread set screws are mounted in each screw nut fitting to provide for alignment of the windows. A pressure ring evenly transmits the force from the set screws to each window. In the alignment procedure the set screws change the alignment of the windows with respect to the laser head. If the reflectors are part of the windows they are also aligned with the windows, or they may be aligned independently. Both the inner and outer O-rings are sufficiently compressible that alignment is possible with lasing vacuum of the system. With these O-ring seals it was possible to evacuate the laser head to a pressure of less than one micron using a mechanical pump. Furthermore, the design set forth above provides for ease of disassembly for cleaning and/or replacement of windows combined with vacuum-tightness and ease of alignment.

It is therefore an object of this invention to provide an annular laser which incorporates therein adjustable windows capable of alignment parallel to each other within 30 second of arc.

It is a further object of this invention to provide an annular laser which permits window alignment while maintaining vacuum within the laser head.

It is another object of this invention to provide an annular laser which supports the pumping flashlamp in such a manner to permit window alignment.

It is still another object of this invention to provide an annular laser in which the flashlamp thereof produces a gain region with a smoothly varying radial intensity distribution with uniform azimuthal output.

It is still a further object of this invention to provide an annular laser with increased gain medium uniformity.

It is still another object of this invention to provide an annular laser in which the laser windows may incorporate the laser reflectors therein for alignment therewith.

It is an additional object of this invention to provide an annular laser in which the windows are capable of easy removability in order to interchange various laser windows.

It is still a further object of this invention to provide an annular laser which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

Figure 1:
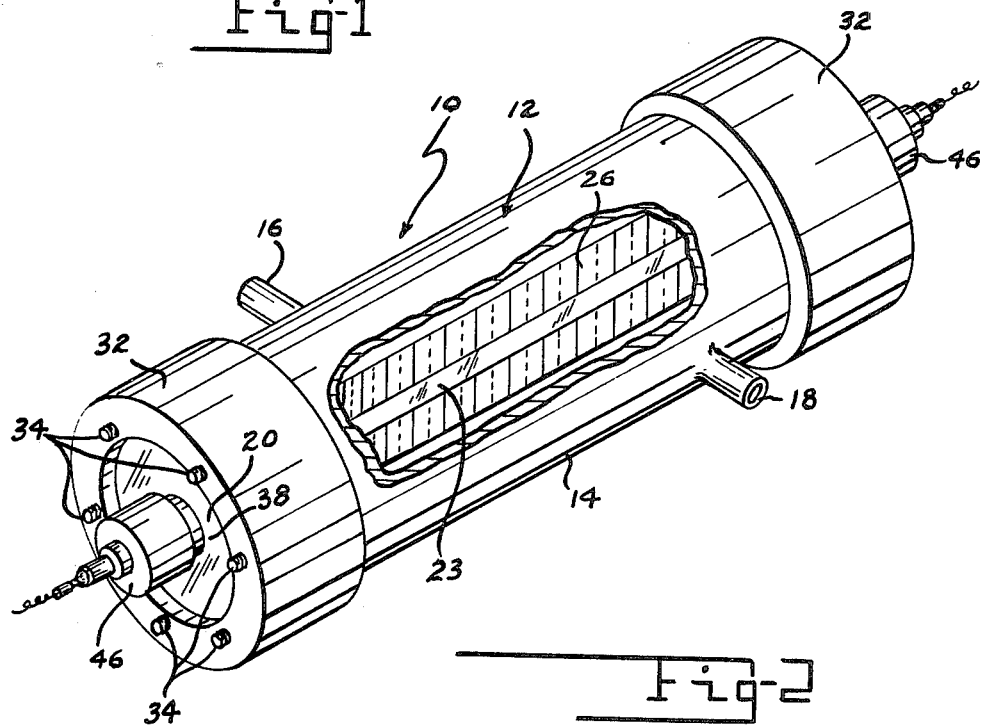
Figure 2:
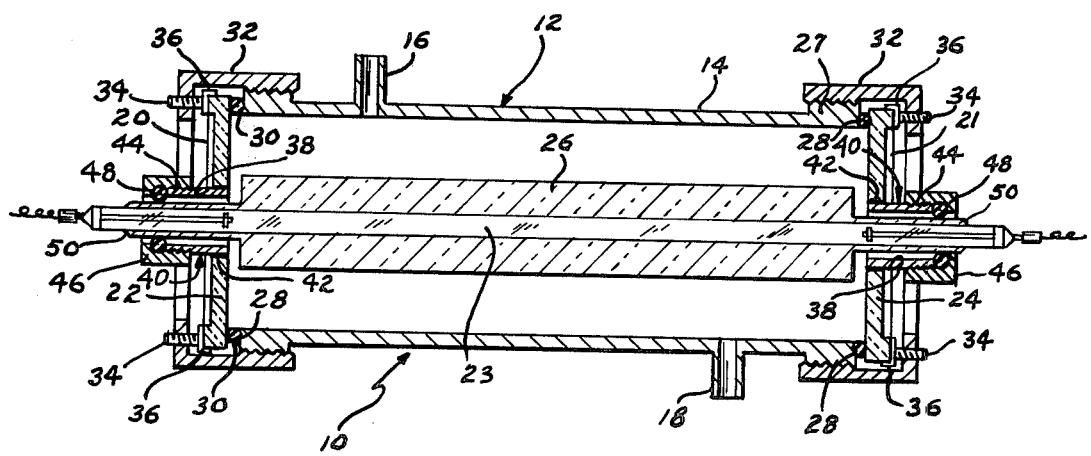

FIG. 1 is a pictorial representation of the annular laser of this invention; and FIG. 2 is a side elevational view of the annular laser of this invention, shown partly in cross-section.

DETAILED DESCRIPTION OF THE PREFERRED EMBODIMENT

Reference is now made to FIGS. 1 and 2 of the drawing which clearly illustrate the annular laser 10 of this invention. Laser 10 is made up of annular laser head 12 in the form of a cylindrically shaped body 14 made of any suitable material such as stainless steel. Extending radially from body 14 are an inlet 16 and outlet 18 operatively connected to the resonant cavity formed between reflectors 20 and 21 mounted upon windows 22 and 24 in a manner set forth hereinbelow. Inlet 16 permits entry of laser reactants while outlet 18 permits the exit of reactant products to a vacuum pump (not shown) in a conventional manner. Centrally located in the axial or longitudinal direction within body 14 is an optical pumping means in the form of an xenon flashlamp 23, the details of which will be set forth hereinbelow.

Sealing the ends of laser head 12 are a pair of windows 22 and 24, respectively. It should be noted however, that even though reflectors 20 and 21 are shown fixedly secured to windows 22 and 24, respectively, in many instances reflectors 20 and 21 are independently attached to and adjustably mounted on laser body 14 so that windows 22 and 24 may be changed without removal of the reflectors. Since the inventive concept deals with the mounting arrangement of windows 22 and 24 a detailed discussion of the mounting arrangement for windows 22 and 24 will be set forth hereinbelow.

Referring particularly to FIG. 2 of the drawing, laser head 12 can be of any suitable size, an example of which being approximately 30 cm long and 6 cm in diameter. Xenon flashlamp 23 is centrally disposed within laser body 14 and is held in place therein by a quartz tube 26. The quartz tube 26 being mounted within windows 22 and 24 in a manner set forth below.

Located at both ends of cylindrical body 14 are enlarged end portions 27 into which are machined O-ring grooves 28 in which are mounted conventional elastomer O-rings 30. O-rings 30 make a vacuum-tight seal between the stainless steel body 14 and each laser window 22 and 24 respectively. A brass retainer ring 32 screws onto the outside of the ends 27 of laser body 14. A plurality of micrometer-thread set screws 34 are circumferentially mounted on each brass retainer ring 32. Although any suitable number of set screws 34 may be used, six are preferred. Each set screw 34 presses against a thin metal pressure ring 36, which serves to transmit evenly force from set screws 34 to windows 22 and 24, respectively. Brass retainer ring 32, set screws 34, and pressure ring 36 together transmit enough force to cause the O-ring 30 to form a vacuum tight seal with windows 22 and 24.

Still referring to FIG. 2 of the drawing, attention is now directed to windows 22 and 24, respectively. Since the mounting of each window 22 and 24 to body 14 (or laser head 12) is identical, the following description, for ease of understanding of this invention, will refer primarily to only one such window 22. However, like numerals will be used in the drawing for identical elements wherever applicable.

Windows 22 and 24 are made of any suitable laser window material such as calcium fluoride and have an antireflection coating thereon. If desired reflectors 20 and 21 may be mounted on windows 22 and 24, respectively. A circular-hole 38 is cut in each laser window 22 and 24 and in reflectors 20 and 21 and a Wilson seal 40 is mounted in hole 38. Seal 40 is secured to window 22 by any suitable adhesive such as epoxy 42, with the epoxy 42 forming a vacuum tight seal between seal 40 and window 22. Each Wilson seal 40 is made up of a body 44, a screw top 46, and an O-ring 48. When the screw cap 46 is screwed down, it applies force to O-ring 48 causing it to expand and form a vacuum-tight seal between body 44 and an elongated end portion 50 on each end of quartz tube 26.

Xenon flashlamp 23 is mounted within quartz tube 26 and discharges with an input energy of approximately 600–800 joules in a manner to be more fully explained hereinbelow. The central position of flashlamp 23 produces a gain region with a smoothly varying radial intensity distribution with uniform azimuthal output. In addition, quartz tube 26 which contains flashlamp 20 has a diameter which is greater than the diameter of screw cap 46, that is, approximately 3.3 cm. As a result thereof, the gain region which is contained between the quartz tube 26 and the outer stainless steel body 14 is entirely accessible through laser windows 22 and 24. This feature of the instant invention increases the gain medium uniformly by preventing absorption of flashlamp energy in an inaccessible region of laser head 12.

Another important aspect of this invention, is that with the mounting arrangement of windows 22 and 24 and quartz tube 26, laser 10 is capable of window alignment parallel to each other within 30 second of arc. Such alignment is essential for, for example, interferometric studies of laser optics.

In the alignment procedure set screws 34 change the alignment of windows 22 and 24 with respect to laser head 12. Both inner and outer O-rings 30 and 48 are sufficiently compressible to permit this alignment while maintaining vacuum in head 12. With the arrangement of laser 10 of the instant invention it is possible to evacuate laser head 12 to a pressure of less than one micron using a conventional vacuum pump.

In addition, the arrangement set forth in detail hereinabove provides for ease of disassembly for cleaning or replacement of windows 22 and 24 combined with vacuum tightness and ease of alignment. As a result thereof, the laser head of this invention finds great utility as a basic tool in the study of annular gain regions. With the interchangeability feature of this invention, laser head 12 becomes an important design tool for high power laser optical systems.

In operation, suitable laser reactants such as $N_2F_4:H_2/D_2:He$ in a ratio of 30:5:100 are flowed through laser head 12 at a pressure of several torr. $H_2$ is used if HF lasing of 2.7 microns is desired, and $D_2$ is used if DF lasing at 3.8 microns is desired. The xenon flashlamp 23 is then discharged by conventional means with an input energy of 600–800 joules. The UV and near UV light from the flash dissociates the $N_2F_4$ yielding F-atoms, which initiate the chemical reaction and give vibrationally excited HF or DF. The gain is sufficiently great that lasing is obtained with as much as 50% outcoupling of laser cavity flux. Suitable window alignment or replacement is easily obtained with the instant invention and, therefore, provides a laser 10 which overcomes many of the problems heretofore encountered in the laser field. It is also again emphasized that although reflectors 20 and 21 are necessary for a complete operational laser, there exact location is in direct relationship to the use of the laser. Reflectors 20 and 21 may be secured to windows 22 and 24, respectively, or they may be mounted external or as a part of body 14 as long as they form an operational laser cavity therebetween.

Although this invention has been described with reference to a particular embodiment, it will be understood to those skilled in the art that this invention is also capable of further and other embodiments within the spirit and scope of the appended claims.

We claim:

1. An annular laser comprising a cylindrically shaped body having a pair of ends and a hollow interior, means for permitting the introduction of laser reactants into said hollow interior of said laser body, a laser window located adjacent each end of said laser body, means operatively connected to said laser body for removably sealing each of said laser windows in position adjacent each of said ends of said laser body, respectively, means operatively connected to each of said sealing means for adjustably mounting each of said laser windows with respect to said laser body, reflecting means operatively aligned adjacent each of said laser windows, respectively, forming a resonant cavity therebetween and means for pumping said laser reactants, said pumping means being centrally located within said hollow laser interior along the longitudinal axis of said laser body, said pumping means being in sealed relationship with respect to said laser windows when said windows are in position adjacent said laser body, said laser being capable of operation when said laser windows are aligned in a preselected orientation.

2. An annular laser as defined in claim 1 wherein said means for removably sealing each of said windows in position comprises a resilient member interposed between said window and an end of said laser body, a removable retainer ring operatively connecting said laser window to said end of said laser body, a resilient member interposed between said laser window and said pumping means and a retainer cap removably connecting said laser window to said pumping means.

3. An annular laser as defined in claim 2 wherein each of said laser windows has a centrally located aperture therein of predetermined diameter, said pumping means being aligned with and having a portion thereof protruding through said aperture, said resilient means interposed between said window and said pumping means being made up of a body portion secured adjacent said aperture in said window and an O-ring positioned adjacent said pumping means.

4. An annular laser as defined in claim 1 wherein said adjustable mounting means comprises a plurality of set screws operatively connected to each of said removable sealing means and a pressure ring interposed between each of said set screws and said laser window.

5. An annular laser as defined in claim 1 wherein said pumping means comprises an xenon flashtube encased within a quartz tube.

6. An annular laser as defined in claim 3 wherein said adjustable mounting means comprises a plurality of set screws operatively connected to each of said removable sealing means and a pressure ring interposed between each of said set screws and said laser window.

7. An annular laser as defined in claim 6 wherein said pumping means comprises an xenon flashtube encased within a quartz tube, said quartz tube having a major portion thereof of a predetermined diameter, said predetermined diameter of said quartz tube being greater than said predetermined diameter of said aperture.

8. An annular laser as defined in claim 7 wherein each of said reflecting means comprises a mirror fixedly secured to the external surface of said laser window.

9. An annular laser head comprising a cylindrically shaped body having a pair of ends and a hollow interior, means for permitting the introduction of laser reactants into said hollow interior of said body, means operatively connected to each of said ends of said laser body for removably sealing a laser window in position adjacent each of said ends of said laser body, respectively, means operatively connected to each of said sealing means for adjustably mounting said laser windows with respect to said laser body, reflecting means operatively aligned adjacent each of said laser windows, respectively, forming a resonant cavity therebetween and means for pumping said laser reactants, whereby said laser is capable of producing an annular laser beam.

10. An annular laser head as defined in claim 9 wherein said pumping means is centrally located within said hollow interior of said laser head.

11. An annular laser head as defined in claim 10 wherein said means for removably sealing each of said windows in position comprises a resilient member interposed between said window and an end of said laser body, a removable retainer ring operatively connecting said laser window to said end of said laser body, a resilient member interposed between said laser window and said pumping means and a retainer cap removably connecting said laser window to said pumping means.

12. An annular laser head as defined in claim 11 wherein said adjustable mounting means comprises a plurality of set screws operatively connected to each of said removable sealing means and a pressure ring interposed between each of said set screws and said laser window.

13. An annular laser head as defined in claim 12 wherein said pumping means comprises an xenon flashtube encased within a quartz tube.

* * * * *